Figure 1:
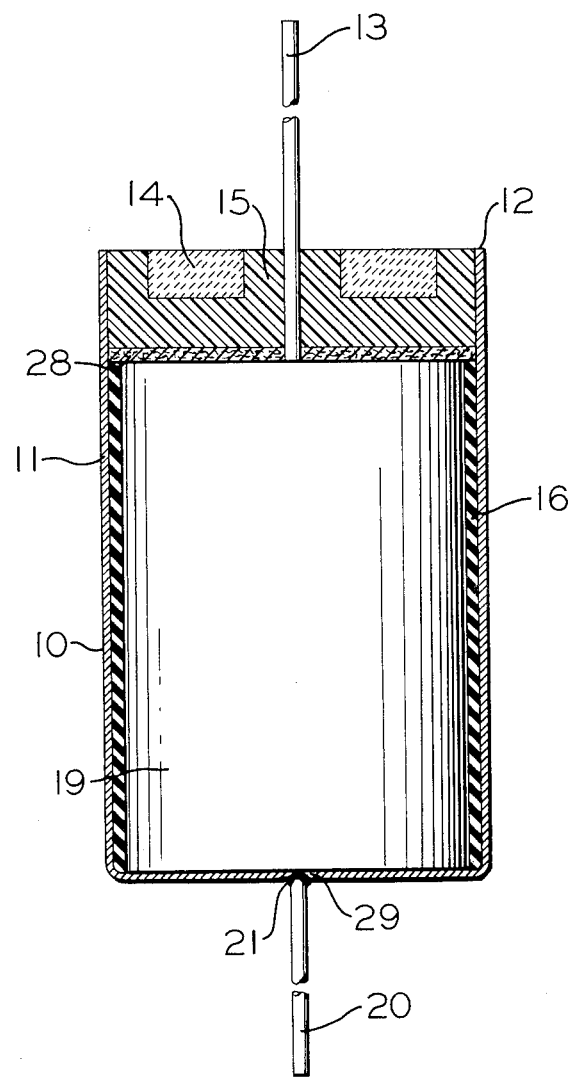

Aug. 22, 1961 P. H. NETHERWOOD ET AL 2,997,414
CAPACITOR END-SEAL PROCESS
Filed Jan. 3, 1956 2 Sheets-Sheet 1

INVENTORS
PAUL H. NETHERWOOD
LEOPOLD LALIBERTE
BY FLOYD SHOR
Roland A Dexter
THEIR ATTORNEY

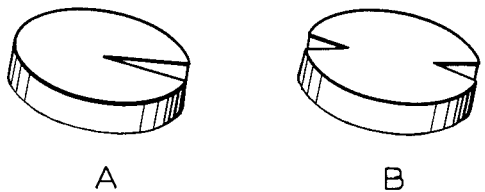
FIG. 2
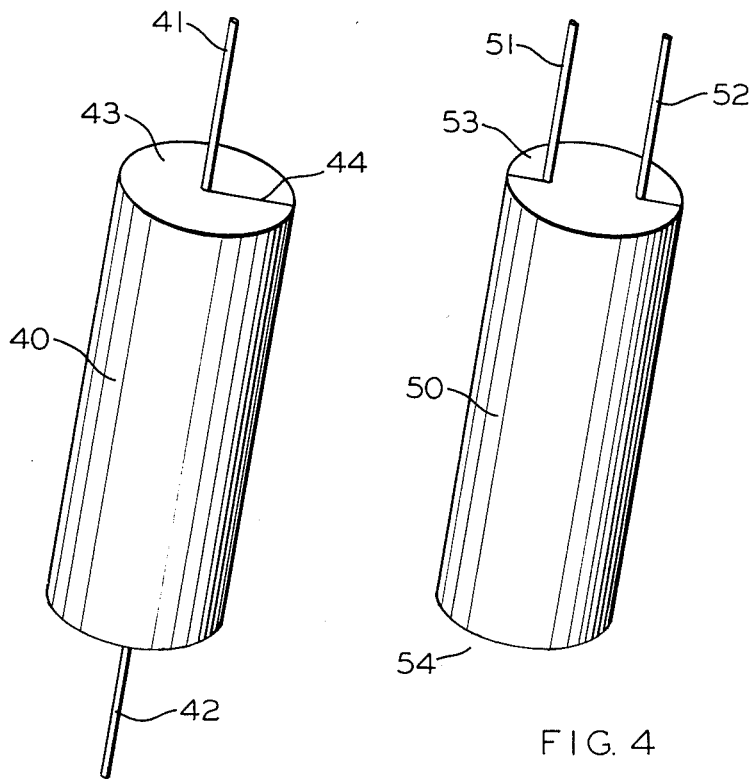
FIG. 3
FIG. 4

United States Patent Office 2,997,414
Patented Aug. 22, 1961

2,997,414
CAPACITOR END-SEAL PROCESS
Paul H. Netherwood and Leopold Laliberte, Williamstown, and Floyd W. Shor, Pittsfield, Mass., assignors to Sprague Electric Company, North Adams, Mass., a corporation of Massachusetts
Filed Jan. 3, 1956, Ser. No. 557,091
2 Claims. (Cl. 154—80)

The present invention relates to a new and improved type of capacitor and more particularly to a process for producing resin bonded floating disc end seal constructions.

For many years small electrostatic capacitors have been produced utilizing external enclosures such as metal can to protect the capacitance unit itself. Such metal enclosed units are of a hermetically sealed construction utilizing numerous types of end seals known within the art. A particularly desirable end seal incorporating a resin bonded floating disc construction is described by W. C. Lamphier in copending U.S. application, Serial No. 488,329, filed February 15, 1955 and issued on June 14, 1960 as U. S. Letters Patent 2,941,024. Although the product set forth therein is remarkable for its simplicity and ability to produce an effective seal which can be cycled from extremely low to extremely high temperatures without failure of the seal, the process is time consuming and difficult to control quality-wise.

It is an object of the present invention to produce a capacitor end seal using a resin bonded floating disc construction by a process of markedly improved efficiency and quality. A further object of the invention is to produce capacitors using the aforesaid end seal construction of uniform construction. Still a further object is to produce an easily assembled and cured resin end seal. Further objects of the invention, as well as the advantages thereof, will be apparent from the body of this specification, the appended claims and the accompanying drawing in which FIGURE 1 is a sectional view of a capacitor assembly including the resin bonded floating disc end seal; FIGURE 2 pictures two variations of pelleted discs for end seals; and, FIGURES 3 and 4 picture representative components produced in accordance with this invention.

In its broadest scope this invention is concerned with improvement in the process of producing encased electrical components having a resinous end seal by pelleting a mineral filled epoxy resin disc of novel configuration before placing it in the end of the casing to be sealed.

In its more limited aspects, the above objects of this invention are achieved by an improvement in the process of making encased capacitors having an end seal comprising a mineral filled epoxy resin mass contiguous with the inner surface of said casing and the capacitor lead wire said improvement comprising pelleting a slotted disc of said mineral filled epoxy resin and thereafter heating said disc in the open end of said metal casing while subjecting the unit to vibratory action or other pressure.

Before considering the process of the invention, consider a representative product resulting therefrom by reference to FIGURE 1. There is shown a capacitor assembly 10 in which there is employed a cylindrical metallic container 11, housing a wound capacitor section 19, and having an open end 12, through which terminal lead 13 of the capacitor projects. A spacer or sleeve 16 of electrically non-conducting material is inserted within the container 11 to prevent accidental shorting of capacitor section 19 to the container, and to further provide a resilient means to prevent mechanical movement of capacitor section 19. About the lead 13 is seen a filled epoxy resin mass 15 in which is positioned a ceramic washer 14. The temperature coefficient of expansion of ceramic washer 14 is less than the expansion of container 11, and epoxy resin 15, thereby resisting expansion or contraction of the end seal in such a manner as to insure continuous contact between the end seal and lead wire 13, as well as between the end seal and container 11.

If desired, a second washer 28 of fibrous material such as paper can be used to keep the epoxy resin from contact with the capacitor section 19, thereby avoiding any inneraction between them. The can has a bottom hole 29 through which another terminal lead 20 of the enclosed capacitor 19 projects. The hole 29 is closed by means of lead-tin solder 21, or other suitable metal alloy, to hermetically seal the unit. Before sealing, the unit can be impregnated with a liquid dielectric that enters through hole 29 and fills all pores and voids, as well as the spacer 16 between the container 11 and the capacitor 19.

The preferred resin is of the epoxy type which is well-known in the art, some of them being disclosed in the Buck et al. United States Patent No. 2,569,929, the Wiles Patent No. 2,528,934, the Greenlee Patent No. 2,542,664, the Bixler Patent No. 2,512,996, the Bender et al. Patent No. 2,506,486, the Greenlee Patents No. 2,510,885 and 2,510,886, the Newey et al. Patent No. 2,553,718, the E. S. Narracott article "Application of Some Epoxide Resins in The Plastics Industry" in British Plastics, October, 1951, pages 341–345 and the W. J. Marmion article "Epoxide Resins" in Research, September, 1954, pages 351–355. In use as an end seal the resin normally is filled with a material which modifies the temperature coefficient of expansion so as to approximate that of the metal housing of the unit. Suitable fillers include alumina, silica, mica, and other similar materials which is admixed into the resin in an amount dictated by the desired temperature coefficient expansion.

Generally in the practice of the process of this invention the following steps are performed, although it is to be understood that in practice several of the steps can be combined into a single operation: blending of the resin and filler into a uniform mixture; pelleting the filled resin into the slotted disc, assembly of the disc into the open end of the capacitor casing, and heating of the assembled unit.

In the blending of the resin and the filler, it is desirable to substantially uniformly distribute the particles of filler into the resinous mass. Such substantially uniform distribution avoids uneven distribution of mechanical stress in the finished end seal when the hermetically sealed unit is temperature cycled over an extreme temperature range, e.g., from −50° C. to +125° C. Typical of a composition which is blended for end seals of metal cased units is 100 parts by weight of the epoxy resin to 50 parts by weight of silica. Alternatively the epoxy resin could be replaced by either the polybutadiene or silicone if desired for a particular application. For paper tubular encased capacitors a representative composition is 50 parts of epoxy resin, 64 parts of talc and 5 parts of an organophilic clay, e.g., dimethyl octadecyl ammonium bentonite.

Alternatively for pre-molded mineral filled phenol formaldehyde resin casings a representative composition is 50 parts of epoxy resin, 49 parts of talc and 5 parts of an organophilic clay as set forth above (all figures given in parts by weight). The addition of clays modifies the system to a thixotropic effecting retention of pellet shape during the heat treatment. The percentage of modified bentonite can vary from 4 to 7% by weight and such an amount is used as necessary to produce the desired gell character of the mix. Such compositions are blended by thoroughly mixing in any of the well-known blenders e.g., model LD–25 sold by Patterson-Kelly for a period of about 15 to about 20 minutes. Generally the blending should be carried out in an atmosphere of relatively low humidity e.g., less than 10%.

The blended powder which has been stored in a moisture-free atmosphere is thereafter pelleted into the desired slotted preform dimension. Such preforms are shown in FIGURE 2. Two types are pictured:

(a) a disc A having a single indentation slot extending to substantially its axis for reception of a lead wire; and, (b) a pelleted disc B having two indentations extending inwardly for reception of a similar number of lead wires.

The preforming of these resin discs can be held to a thickness variation of approximately ±1 mil by use of a conventional press using punch and die, which presses are well-known to the art. Useful pressures for obtaining the preforms according to the inventive process, range from about 1500 to 3000 pounds per square inch for the filled epoxy resin compositions set forth above.

Now that the preforms have been produced, they can be distributed to the assembly operators for incorporation into the capacitor structure which for illustrative purposes we shall consider to be the structure of FIG. 1. After assembly of the capacitor section into the metal container, a preform pellet and thereafter a steatite or similar ceramic disc which may be either slotted or annular is placed over the assembly and racked up into suitable processing jigs, which jigs may include for example 1000 piece lots. In contrast to the previous procedure, it is to be noted that the ceramic annular disc merely sits on the surface of the resin disc. With the paper tubes and pre-molded phenolic resin containers, the ceramic disc need not be used.

The thermal process of flowing the disc onto the inner surface of the container and onto the lead wire may be varied as desired. The racked metal can type of units set forth immediately above are exposed to an atmosphere of elevated temperature for an initial precure to both dispose the resin into contact with both the inner surface of the metal casing and the terminal lead wire, and to allow the immersion of the ceramic annular disc into the resin disc until at least the outer surface of the annular ceramic disc is substantially planar to the surface of the resin. Such precure is accomplished for the mineral filled epoxy resin by heating for about 20 minutes in an atmosphere of about 275° F. Simultaneous with this exposure to temperature, the units are vibrated so as to facilitate the thermal flow of the resin. Surprisingly enough it has been found that low level vibration readily seats the annular ceramic disc into the resinous mass to produce remarkably uniform end seals of much improved quality and mechanical nature. A convenient way of carrying out the precure of the units is to place them in a conveyor oven with the desired temperature and utilize the vibration of the conveyor belt as it passes through the oven to seat the ceramic annular disc in the aforementioned uniform manner. The oscillation has a frequency of about 15 cycles per second and amplitude of about 2 inches.

Finally the metal encased units are subjected to a further thermal treatment. This is obtained for the silica filled epoxy type of end seal construction by exposure to a temperature of from about 250° F. to about 350° F. for a period of about 1½ to about 2½ hours. Thereafter if desired, the units are impregnated with the particular impregnant acquired by the application. The impregnation step does not constitute part of the present invention.

In contrast, the units in which the thixotropic epoxy resin is used are thermally cured by initially heating the pellets at 110° C. for about two minutes, pressing the heated pellets into the open end or ends of the container at pressures of from about 20 to about 40 pounds per square inch at 85° C. These latter units are pictorially represented in FIGURES 3 and 4. In FIGURE 3 the outer casing 40 is of the known paper tube. Terminal leads are designated as 41 and 42. The pelleted resin thermally cured 43 has a faint line 44 indicating the indentation of the pellet which has flowed together under the influence of heat. In FIGURE 4 is a premolded resin casing 50 having both terminals 51 and 52 at the same end. For such a seal pellet type shown in FIGURE 2B would be used as the end seal 53. Impregnation after assembly can be conducted through an eyelet at the opposed end 54. Alternatively the unit can be impregnated prior to sealing of the ends. These end seals are thus seen to be susceptible to numerous variations, in that there can be a plurality of indentations which can be of a dimension as triangular, rectangular, etc.

As an example of the present invention without limiting its scope, a capacitor section made of convolutely wound ribbons of aluminum foil and paper, with the respective electrode foils projecting from opposite ends of the winding, had 0.02" in diameter lead wires of dip-tinned copper separately soldered to their respective extensions. This section was placed in an open ended cylindrical brass can having an outer diameter of 0.175". The closed end of the container had a central opening 0.04" in diameter, through which opening one of the lead wires was passed. The end seal composition was made up of 60 parts by weight of powdered epoxy resin and 30 parts by weight of powdered silica passing through a 300 mesh screen, and 2 parts by weight of dimethylene-triamine, the catalytic agent. The mixture was blended for a period of 15 minutes in a blending machine. The powder was fed into a Stokes Model F press which produced a pellet of 0.116" thickness, an outer diameter of 0.146" and a slot extending to the center of the pellet 0.50" wide. A paper washer was placed over the central lead wire and disposed against the exposed end of the capacitor section. The preform pellet was placed down against the paper spacer and thereafter a steatite annular disc having an outer diameter of 0.13" and an inner diameter of 0.05" and a maximum thickness of 0.078" was slipped over the lead protruding from the open end and disposed against the preformed resinous disc. The unit was then placed in a rack and sent through a conveyor belt oven exposing it for 20 minutes to a temperature of approximately 275° F. During this exposure continual agitation of the section was conducted due to the movement of the conveyor belt. Thereafter the unit was removed from the conveyor belt and placed into an oven at 300° F. for two hours, obtaining a full and complete cure of the end seal construction. Finally the unit was impregnated with polyisobutylene by vacuum techniques and the impregnation channel was sealed by solder. The resulting assembly can satisfactorily withstand as many as 100 thermal cycles of cooling to —55° and heating to 100° C. without apparent change, in fact the unit can be taken directly from a Dry-Ice bath, held at —55° C. and immediately dropped into boiling water without damaging the seal or any other portion of the assembly.

Alternatively a similar section of a greater number of turns, outer diameter of section $^{17}/_{32}$ inch, was placed in a paper tube having an outer diameter of 0.625". The end seal composition was made up of 50 parts of epoxy resin, 64 parts of talc and 5 parts dimethyl octadecyl ammonium bentonite (sold as Bentone 34 by National Lead Company of New York, New York), and 6 parts of m-phenylene diamine (all parts are by weight) blended for 15 minutes in a blending machine. The powdered mixture (passed through a 300 mesh screen) was fed into a Stokes Model T press from which was produced pellets of 0.116" thickness, outer diameter of 0.500" and a 0.063" slot extending inwards for about 0.250". A pellet of this dimension after heating for two minutes at 125° C. was placed at each end of the tube against the capacitor section with each of the axial lead wires positioned in its respective slot. The unit was then jigged and subjected to a pressure of about 30 pounds per square inch so that the pellet flows together to remove the slot and bond to the inner surface of the tube and the lead wire. Thereafter the unit was removed from the jig and bulk cured with other units for 16 hours at 85° C.

The advantages of our invention are in the most part obvious. The reject level is reduced by 95% over that resulting with prior art techniques. The improvement in quality is simultaneous with substantial swing in the amount of resin used thus markedly reducing the cost of the unit as well as reducing the amount of labor required for production. The slotted pellet facilitates automatic production of the capacitor for it can be readily slipped onto the lead wire avoiding the difficult threading of the art. Further it is possible to readily seal both ends of an insulator tube and thereafter bulk cure the end seals without rupture.

As many apparently widely different embodiments of this invention may be made without departing from the spirit and scope hereof, it is to be understood that the invention is not limited to the specific embodiments hereof as defined in the appended claims.

We claim:

1. A process for producing an end-seal for an open end of a capacitor casing of the type having a capacitor lead-wire extending therefrom, said process comprising uniformly blending mineral filler and epoxy resin, pelleting the uniform blend into a disc having an inwardly extending slot, heating the slotted pellet, positioning the heated pellet at the open end of a capacitor casing with a lead-wire from a capacitor within the casing being fitted in the slot, pressing the positioned pellet into the casing thereby closing the slot around the lead-wire and bonding to the casing, and curing the pressed pellet.

2. The process of claim 1 wherein said pelleting is at a pressure of about 1500 to about 3000 pounds per square inch, said heating is for about two minutes at about 110° C. to about 125° C., said pressing is at a pressure of about 20 to about 40 pounds per square inch, and said curing is at about 85° C.

References Cited in the file of this patent

UNITED STATES PATENTS

| | | |
|---|---|---|
| 2,004,647 | Beer | June 11, 1935 |
| 2,312,579 | O'Brien | Mar. 2, 1943 |
| 2,382,970 | Borcherdt | Aug. 21, 1945 |
| 2,425,528 | Haim et al. | Aug. 12, 1947 |
| 2,517,717 | Rose | Aug. 8, 1950 |
| 2,527,373 | Parson | Oct. 24, 1950 |
| 2,535,517 | Rhodes | Dec. 26, 1950 |
| 2,611,793 | Simpson | Sept. 23, 1952 |
| 2,674,646 | Schoch | Apr. 6, 1954 |
| 2,676,287 | Brennan | Apr. 20, 1954 |
| 2,713,700 | Fisher | July 26, 1955 |
| 2,730,473 | Batezell et al. | Jan. 10, 1956 |
| 2,773,158 | Myers | Dec. 4, 1956 |
| 2,802,896 | Tierman | Aug. 13, 1957 |

FOREIGN PATENTS

| | | |
|---|---|---|
| 567,754 | Great Britain | Mar. 1, 1945 |
| 696,241 | Great Britain | Aug. 26, 1953 |

OTHER REFERENCES

"Electrical Manufacturing," September 1952 (page 138 relied upon).